Fig.1.

Inventor
Francis G. Gale
by Heard Smith & Tennant
Attys.

F. G. GALE.
TUBE WELDING MACHINE.
APPLICATION FILED MAR. 2, 1921.

1,434,884.

Patented Nov. 7, 1922.
9 SHEETS—SHEET 6.

Inventor
Francis G. Gale
by Heard Smith & Tennant
Attys.

F. G. GALE.
TUBE WELDING MACHINE.
APPLICATION FILED MAR. 2, 1921.

1,434,884.

Patented Nov. 7, 1922.

Inventor
Francis G. Gale
by Smith & Tennant
Attys.

Inventor.
Francis G. Gale
by Heard Smith & Tennant.
Attys.

Patented Nov. 7, 1922.

1,434,884

UNITED STATES PATENT OFFICE.

FRANCIS G. GALE, OF WATERVILLE, QUEBEC, CANADA.

TUBE-WELDING MACHINE.

Application filed March 2, 1921. Serial No. 449,266.

*To all whom it may concern:*

Be it known that I, FRANCIS G. GALE, a subject of the King of Great Britain, residing at Waterville, Province of Quebec, Canada, have invented an Improvement in Tube-Welding Machines, of which the following description, in connection with the accompanying drawing, is a specification, like characters on the drawing representing like parts.

This invention relates to a machine for welding tubes which have been previously rolled into shape from skelps and the object of the invention is to provide an improved machine for this purpose which has the various novel features all as will be more fully hereinafter set forth and then pointed out in the appended claims.

In the drawings wherein I have shown a selected embodiment of the invention.

The machine herein shown is of that type having a pair of contact rolls adapted to engage the tube to be welded either side of the seam and a pair of presser rolls acting against the side of the shaped tube at the welding point for the purpose of pressing closely together the abutting edges that are to be welded together.

The machine comprises two pairs of feed rolls, one situated in advance of the contact rolls and the other in the rear thereof and both of which operate not only to give feeding movement to the tube but also shape the tube in case it is distorted. Each pair of feeding rolls is mounted in a novel way and novel means is provided for adjusting the rolls to different sizes of tubes. The machine also comprises novel means for guiding the formed tube while it is being acted on by the feed rolls and while it is passing to the contact rolls so that the joint in the tube which is to be welded will be properly presented to the contact rolls. Said guiding means serve to hold the tube from movement laterally and also prevent it from turning on its axis. The contact rolls and the shaping rolls are adjustably mounted so that suitable adjustments can be made for different sizes and shapes of tubes.

All of these operative parts are supported on a suitable frame 1 which has as part of its structure a bed portion 2 that constitutes the support for the shaping rolls and the presser rolls.

The contact rolls by which the welding is done are shown at 3 and they have the usual disk form and are adapted to engage the side of the formed tube 4 to be welded at either side of the seam as usual in tube welding machines of this type. The presser rolls which engage the sides of the tube at the welding point are indicated at 5. These presser rolls are geared together so that they rotate in unison and they may either be driven or they may be in the nature of idler rolls which receive their rotation solely from the movement of the tube 4. Each presser roll is arranged to rotate about a vertical axis and is journalled in a support or carriage 6 which is received in ways 7 formed on a portion 8 of the frame. Each presser roll 5 is mounted on the vertical shaft 9 which is journaled in suitable bearings 10 formed in the carriage or support 6 and each roll also has rigid therewith a gear 11, said gears meshing with each other as shown so as to cause the rolls to operate in unison. The gears are illustrated as being connected to the rolls by means of pins 12.

Each carriage 6 is retained in its adjusted position in the ways 7 by means of an eye bolt 13 secured thereto at 14 and extending through a boss 15 formed on the portion 8 of the frame, each eye bolt having check nuts 16 thereon which engage the ends of the boss 15 and which not only hold the carriage rigidly in its adjusted position, but provide means by which the carriages may be adjusted toward and from each other.

Each carriage 6 is formed with the base portion receiving the lower bearing 10 and with the top portion 17 receiving the upper bearing 10 and with the sides 18 connecting the base, top and sides of each carriage forming an integral structure and the rolls 5 and gears 11 are situated within such structure.

In tube welding machines it is necessary to employ presser rolls 5 of different sizes and shapes, depending on the size and shape of the tube to be welded, and in order to change the rolls 5 I have herein provided a construction wherein the spindles or shafts 9 may be moved downwardly and withdrawn from the rolls, thus permitting the rolls to be moved laterally out from under the top portion 17 of the carriage. Each shaft 9 is formed at its lower end with an extension 19 which is journalled in a sleeve 20 situated below the carriage and having rack teeth 21 thereon which mesh with the teeth of a pinion 22 fast on a shaft 23 that is journalled in bearings 24 depending from the portion 8 of the frame. Each shaft has a collar 25 thereon engaging the under side of the lower bearing 10 and also a collar 27 at its lower end which engages the lower end of the sleeve so that the sleeve is confined between the two collars. Each shaft is held in place by the nut 26 on its upper end. Whenever the rolls 5 are to be changed, the nuts 26 are moved and the shafts 23 are turned thereby to act through the pinions 22 to lower the sleeves 20, this movement withdrawing the shafts from the rolls 5 thereby permitting said rolls to be removed. The shafts 23 are provided with hand wheels 28 at their ends by which they may be operated.

The pair of feed rolls which are situated in advance of the contact rolls are indicated at 29 and 30 and those situated in the rear of the contact rolls are indicated at 31 and 32.

The rolls 29 and 30 are mounted in a frame 33 which is adjustable vertically in a supporting frame or stand 34 that is secured to the bed plate 2. The lower roll 30 is journalled in bearings 35 which are stationarily carried by the frame 33. The bearings 36 for the upper roll 29 are carried in a yoke shaped member 37 which is adjustable vertically in the frame 33, thereby to provide for adjusting the rolls 29 and 30 toward and from each other. This yoke shaped member is adjusted and held in adjusted position by means of an adjusting screw 38 which is screw-threaded into the member 37 and which extends through the cross bar 39 of the frame 33 and is provided with two collars 40 and 41 that engage the cross bar 39 on the bottom and top thereof. The upper end of this adjusting screw extends through an aperture 42 formed in the top of the outside frame 34 and is provided with a squared portion 43 to receive a wrench. By turning the screw 38 therefore the upper roll 29 can be adjusted vertically relative to the lower roll 30.

The frame 33 is vertically adjustable in the outside supporting frame 34 by means of an adjusting screw 44 which is screw-threaded into the lower end of the frame 33 and is swivelled in the lower cross bar 45 of the outside frame 34, said screw having the two collars 46 thereon which engage said cross bar and prevent longitudinal movement of the screw therein. By adjusting the screw 44 the frame 33 with both rolls can be raised and lowered, and by adjusting the screw 38 the rolls 29 and 30 can be adjusted relative to each other.

The feed rolls 31 and 32 are supported in a similar manner.

The rolls of each pair are geared together by gears 47 that are rigid with the rolls and the lower gear of each pair meshes with and is driven by a driving gear 48 fast on a shaft 49 extending transversely of the bed and journalled in suitable bearings 50 carried thereby. The two shafts 49 are driven from a driving shaft 51 which extends longitudinally of the frame and is provided at each end with a bevelled gear 52 which meshes with a bevelled gear 53 on the corresponding shaft 49.

The two pairs of feed rolls are thus driven in unison and at the same speed.

The driving shaft 51 may be rotated from any suitable source of power. In the construction shown, I have provided for this purpose an electric motor 54 which is mounted on a base or platform 55 situated beneath the bed plate 2. The shaft of this motor 54 has a pinion 56 thereon meshing with and driving a gear 57 on a shaft 58, and said shaft has a pinion 59 thereon which meshes with and drives a gear 60 carried by a short shaft 61. The gear 60 has rigid therewith a pinion 62 meshing with and driving a gear 63 on a shaft 64, said latter shaft having a bevelled gear 65 thereon which meshes with and drives the bevelled gear 66 on a vertical shaft 67 that is geared to the shaft 51 by means of bevelled gears 68.

Figure 9:
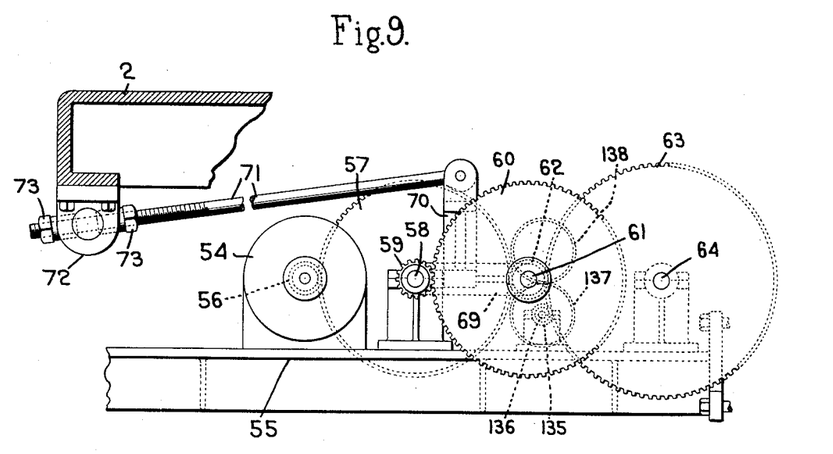
Fig. 9 is a view showing the driving mechanism.
Figure 10:
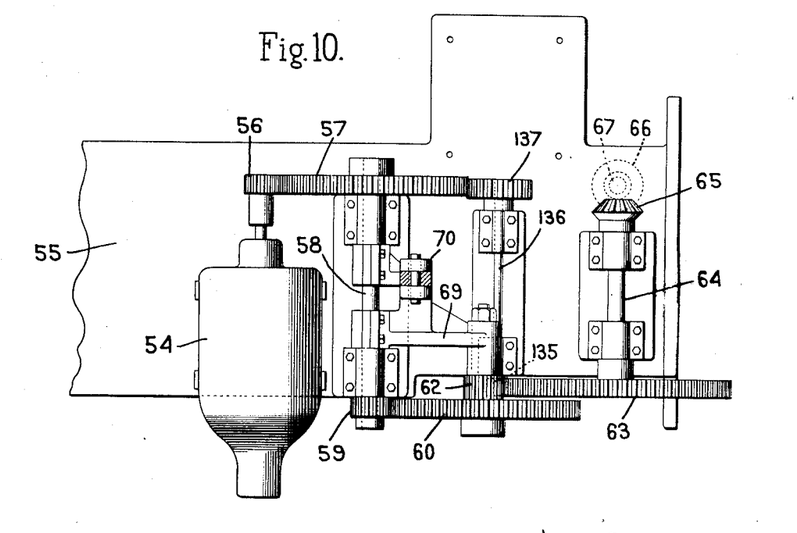
Fig. 10 is a plan view of Fig. 9.

I have shown in Fig. 9 a construction by which the relative speed of the gears 60 and 63 can be changed thereby providing for varying the speed of the feed rolls 29 and 30, 31 and 32.

The short shaft 61 is journalled in an arm 69 which is mounted to swing about a shaft 58 and this arm has a lateral extension 70 to which is connected a link 71 that extends through a boss 72 depending from the bed plate 2, said link being screw threaded and having adjusting nuts 73 thereon situated either side of the boss. By adjusting these nuts the arm 69 can be turned about the shaft 58. As the arm 69 is moved upwardly the pinion 62 will be carried out of mesh with the gear 63 but the gear 60 will always remain in mesh with the pinion 59. The gears 60 and 62 are removable from the shaft 61 so that a pinion 62 of a larger size than that shown in the drawings may be used if desired. When such larger pinion is used then the arm 69 will have to be swung into position above that illustrated in Fig. 9.

The present machine includes in its construction suitable means for guiding the tube while it is being acted on by the feed rolls and for properly supporting the tube in its passage from the feed rolls to the contact rolls. The guiding means is such that it holds the tube from turning about its axis thus insuring that the seam or joint in the tube will be always properly presented to the contact rolls. This guiding of the tube to prevent it from being turned about its axis is secured by means of a mandrel 74 over which the tube passes and two supporting fins 75, 76 which are secured to the mandrel and by which it is supported. These fins are made of relatively thin sheet metal and as the tube is passed over the mandrel between the feed rolls the fins occupy the slot between the edges 175 of the tube that are to be welded together. The mandrel 74 is of considerable length and the fins 75 and 76 are situated at the ends of the mandrel and these fins serve to hold the tube from turning about its axis and keep the tube always with the joint to be welded in line with the contact rolls. The fin 75 is secured to a support 77 situated in front of the rolls 29 and 30 and said fin is provided with the extension 78 which is situated between the rolls, the roll 30 being provided with a peripheral groove 79 to receive such extension.

Figure 13:
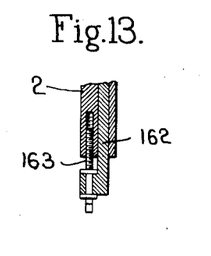
Fig. 13 is a detail view showing the means for adjusting one end of the mandrel.

The mandrel 74 is made adjustable at each end and this is accomplished by adjustably mounting the fins 75 and 76. The support 77 for the fin 75 is provided with a depending arm 162 which is capable of vertical movement in suitable ways formed in the bed 2. The lower end of the arm 162 has an adjusting screw 163 which is screw-threaded into the bed, as seen in Fig. 13, so that by turning the adjusting screw the fin 75 can be raised and lowered. The fin 76 is connected to the lower end of an adjusting screw 80 which has screw-threaded engagement with a nut member in the form of a spiral gear 81 that is received between two blocks 82 and therefore cannot move longitudinally of the screw. The member 81 meshes with a worm 83 on a transverse shaft 84 so that by turning the shaft 84 the proper adjustment of the mandrel can be secured.

In introducing a formed tube into the machine, said tube is placed over the end of the mandrel 74 with the seam in the tube in line with the fins and as the tube is passed between the feed rolls 29 and 30 the fins occupy the seam of the tube. These fins are made of very thin stock so that they do not open the seam to any appreciable extent.

Figures 5, 11:
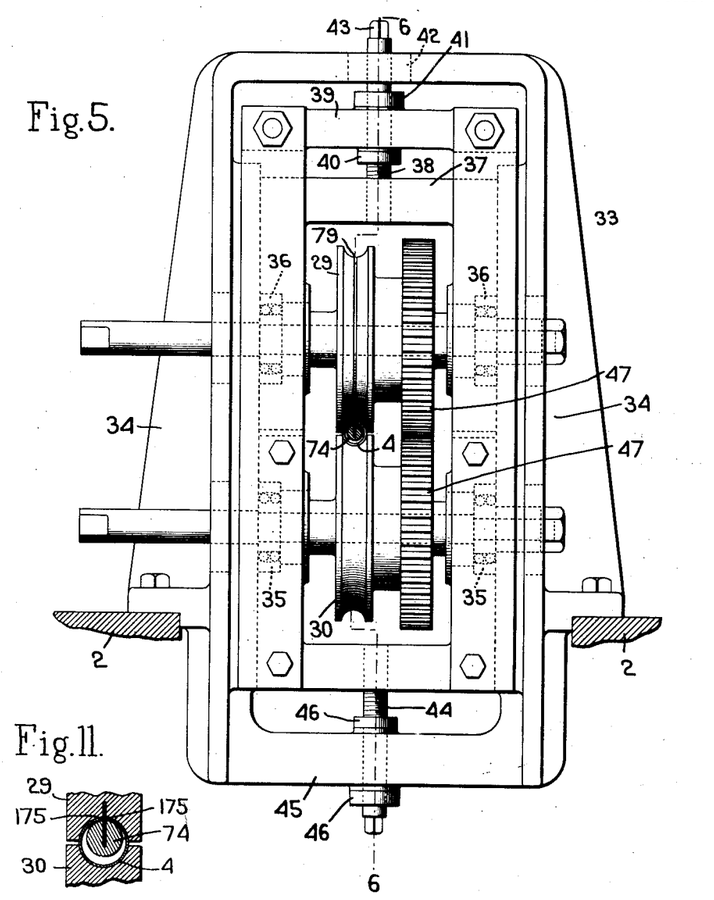
Fig. 5 is a view showing a pair of shaping rolls and the manner of supporting and adjusting them.
Fig. 11 is a section through the tube and mandrel at the point when the tube is acted on by the feed rolls 29 and 30.
Figures 6, 7:
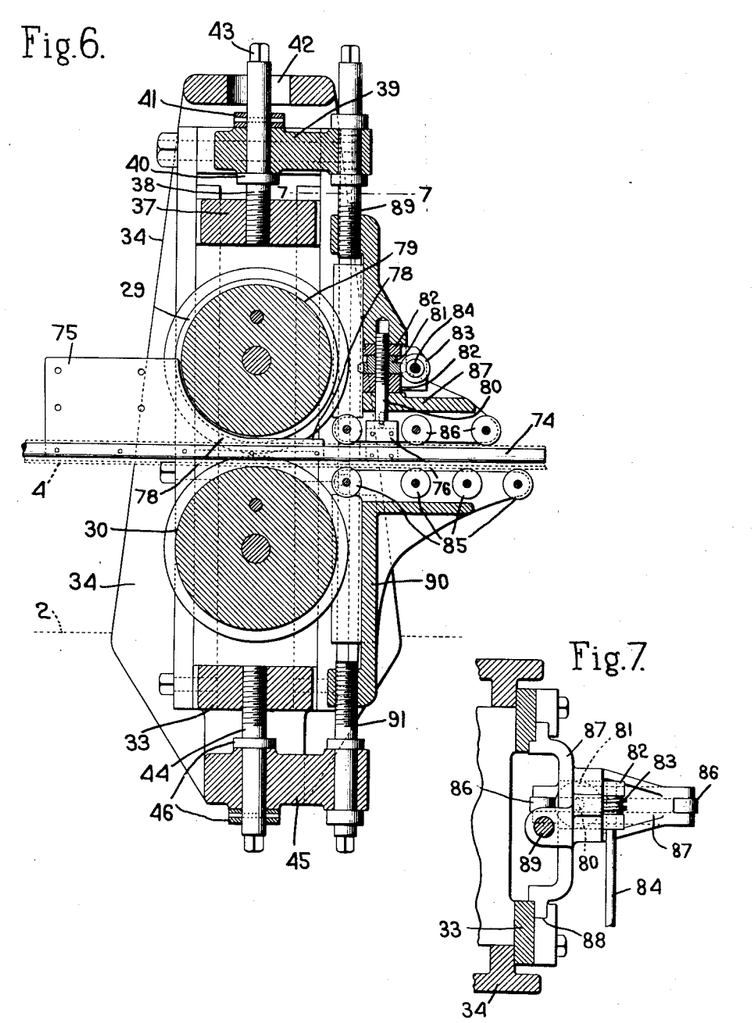
Fig. 6 is a section on the line 6—6, Fig. 5.
Fig. 7 is a section on the line 7—7, Fig. 6.
Figure 12:
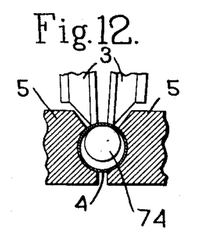
Fig. 12 is a section showing the tube as it passes between the presser rolls.

The mandrel 74 is considerably smaller than the interior diameter of the tube 4 as clearly seen in Figs. 11 and 12 and to properly guide the tube as it passes from the feed rolls to the contact rolls, I propose to employ a plurality of guide rolls operating on the sides of the tube. Such guide rolls comprise a plurality of rolls 86 situated to engage the top of the tube in its passage from the feed rolls to the contact rolls, a plurality of rolls 85 situated to engage the bottom of the tube, and other rolls 92 situated to engage the sides of the tube. These various rolls are adjustable to fit different sizes of tubes and they furnish means for accurately guiding and supporting the tube between the feed rolls and contact rolls. These guiding rolls keep the tube in proper position vertically and horizontally and the fins 75 and 76 prevent the tube from turning about its axis. The rolls 86 are mounted on a bracket 87 which is slidably mounted in ways 88 carried by the inner frame 33 and this bracket has screw-threaded engagement with an adjusting screw 89 journalled in the upper end 39 of the inner frame 33. With this arrangement, the bracket 87 can be adjusted vertically as desired. The adjusting screw 80 and worm gear 81 are supported by this bracket 87. The rolls 85 are mounted in a similar bracket 90 which is slidably mounted in ways in the frame 33 and which has screw-threaded engagement with an adjusting screw 91 journalled in the lower portion 45 of the outside frame 34, said adjusting screw providing for vertical adjustment of the lower rolls 85.

Each of the rolls 92 which engage the sides of the tube is journalled on a slide 93 that is adjustably secured to the side wall 18 of one of the supports 16 over the presser rolls 5. These slides 93 operate in ways 94 and each is adjusted by means of an adjusting screw 95 which has screw-threaded engagement therewith and is journalled in a boss 96 carried by the support 6 and is provided with a hand wheel 97 by which it may be operated.

Figure 8:
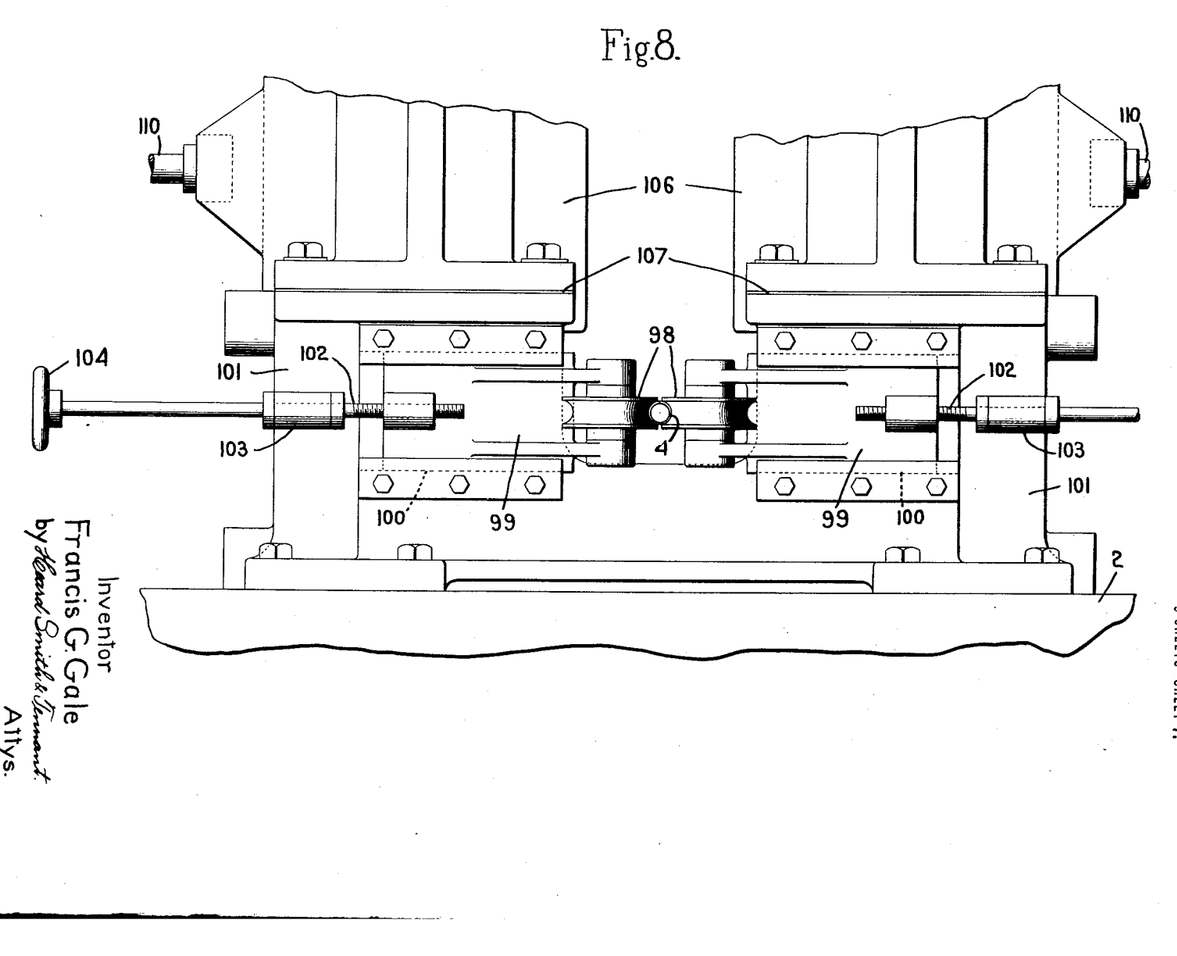
Fig. 8 is a view showing the support for the transformer.

I have also illustrated other feed rolls arranged to act on the tube after it leaves the contact rolls and before it reaches the feed rolls 31 and 32. These other rolls are indicated at 98, there are four of such rolls. Each roll is mounted on a slide 99 which is guided in ways 100, on a portion 101, of the frame that supports the transformer, each slide being adjusted longitudinally by means of an adjusting screw 102 journalled in suitable bearings 103 carried by the frame and having a hand wheel 104 at its end by which it may be operated. This construction is shown best in Fig. 8.

With this arrangement of guiding the tube a formed tube of any desired length can be introduced into the machine by inserting it over the mandrel and as it is carried through the machine it is properly guided so that the welding will be correctly done and it is delivered from the machine as a completely welded tube.

The feed rolls 31 and 32 are supported in a manner similar to the feed rolls 29 and 30.

The transformer, which may be of any suitable construction, is indicated generally at 105 and it is supported by a two part head member 106, each part being secured to one of the supports 101 of the frame, said head member sections being insulated by suitable insulations 107. This head 106 also supports the contact rolls 3 and said rolls are mounted on the support so that they can be adjusted both transversely and vertically.

Each head member section 106 is provided with ways 108 in which is slidably mounted a carriage 109, said carriage being adjustable horizontally in said ways by means of an adjusting screw 110. Each carriage 109 is provided with vertical ways 111 in which is received a slide 112, that is vertically adjusted in said ways by means of an adjusting screw 113 swivelled to the carriage 109.

Each slide 112 carries a bearing 114 in which a contact roll is journalled. Each contact roll is provided with a spindle or shaft portion 115 which is journalled in the bearing 114 and the bearings are arranged at a slight inclination to the horizontal so that the contact rolls have the inclined position best seen in Fig. 3. By means of this adjustment the contact rolls can be adjusted vertically in their carriages 109 and can be also adjusted toward and from each other by an adjustment of said carriages.

Means are provided for maintaining the contact rolls cool by the circulation of a cooling medium through suitable chambers in the rolls. Each roll is provided with an annular chamber 116 which communicates through ducts 117 with a passage 118 extending axially of the spindle, the outer end of said passage having connection with a circulating pipe 119. The chamber 116 also communicates through ducts 120 with a pipe or conduit 121 situated within the passage 118 and communicating at its outer end with another circulating pipe 122. These circulating pipes 119 and 122 are so constructed that a cooling medium may be introduced through one of said pipes into the chamber 116, and may be led from said chamber through the other of said pipes.

Figure 1:
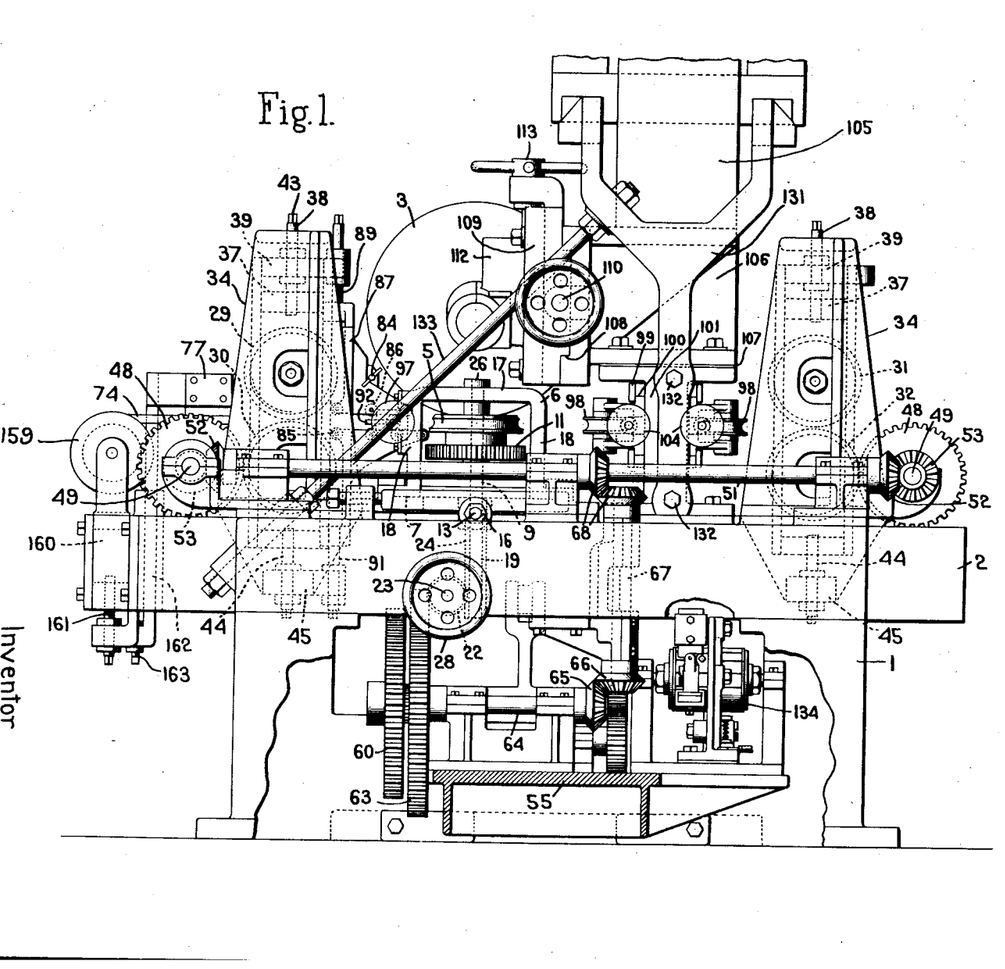
Fig. 1 is a side view of a tube welding machine made in accordance with my invention.
Figure 2:
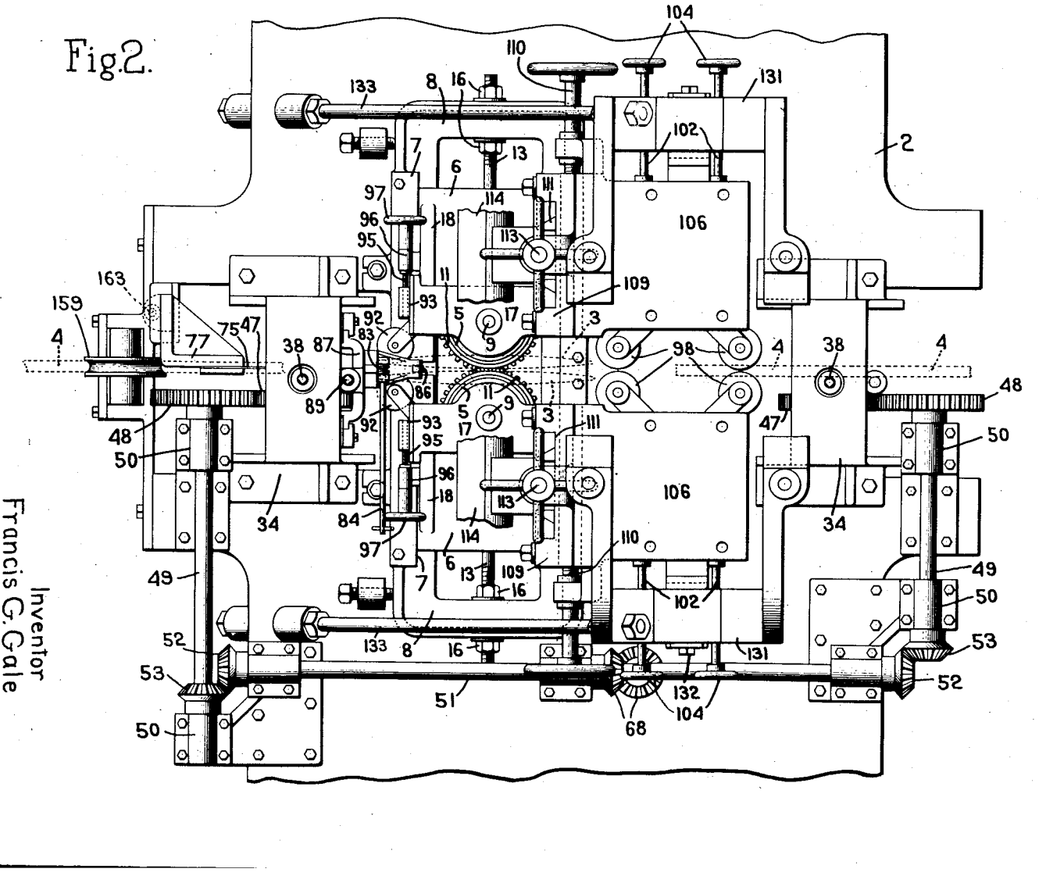
Fig. 2 is a top plan view with a portion taken out.
Figure 3:
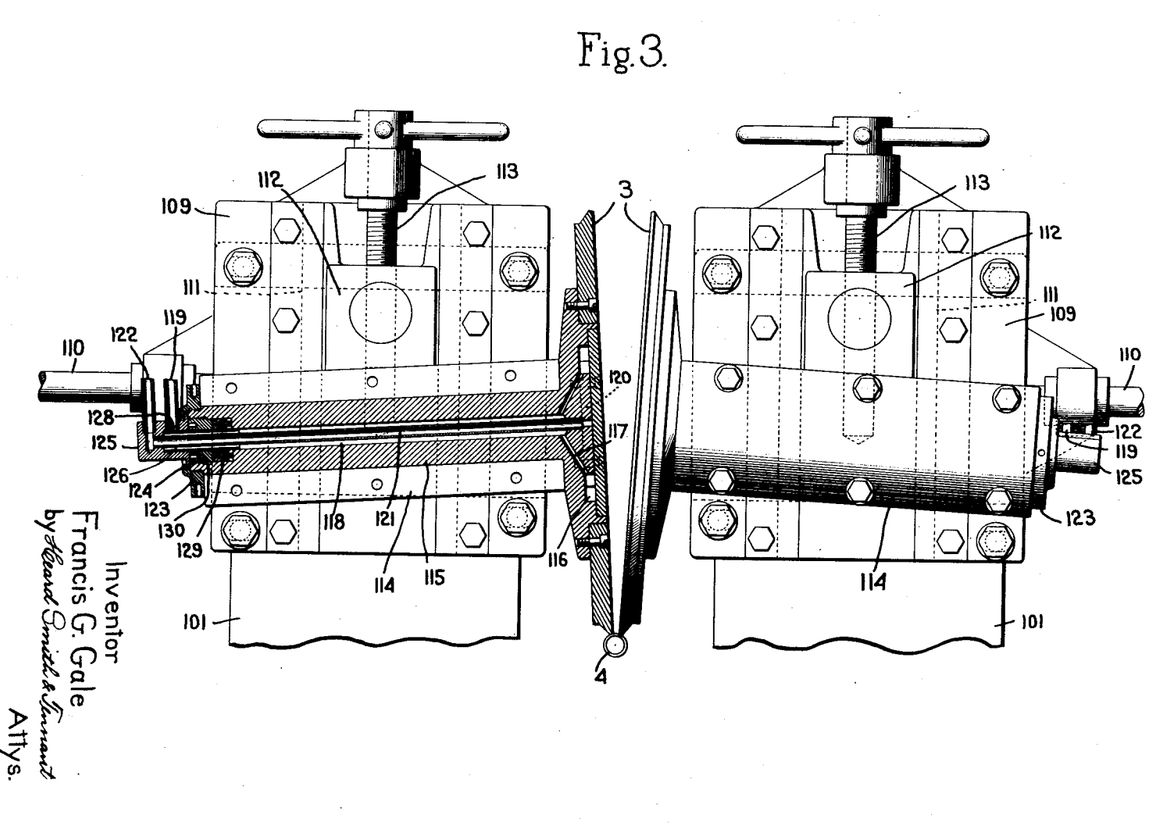
Fig. 3 shows the contact rolls and the manner of mounting them.
Figure 4:
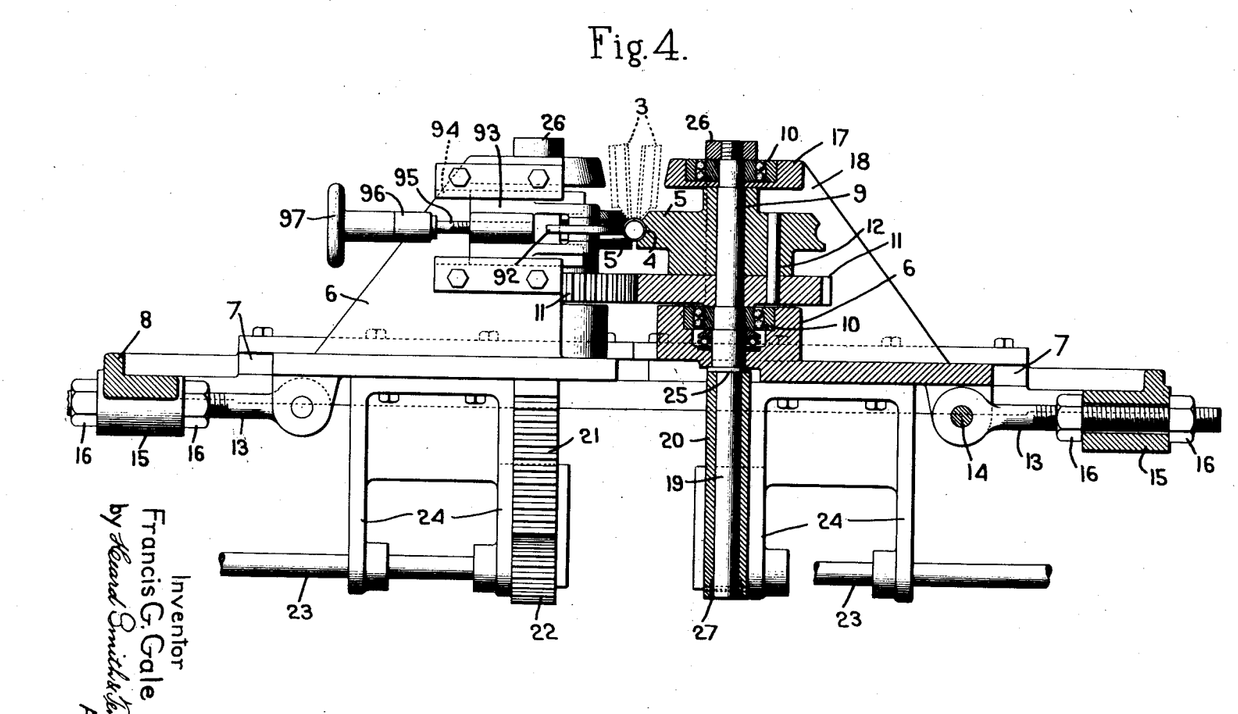
Fig. 4 shows the presser rolls and their manner of mounting.

In order to provide for the continuous circulation of the cooling medium while the contact rolls are rotating, I have adopted the construction best seen in Fig. 3. The end of each shaft 115 projects slightly beyond the bearing 114 and has a flanged collar 123 screwed thereto, the flange of said collar overlying a flange 124 on a stationary head piece or manifold 125 to which the circulating pipes 119 and 122 are connected. This stationary head piece or manifold 125 has a tube 126 rigidly secured thereto, the end of which fits the outer end of the passage 118 and which forms a continuation of said passage, said tube 126 having a port 128 which communicates with the tube 119. To make a tight joint and prevent the water from leaking around the tube 126, the outer end of the shaft 115 is counter bearing to receive a backing 129 which is held in place by a gland 130 screwed into the end of the shaft. The outer end of the tube 121 is journalled in the manifold 125, the latter being provided with suitable passages forming a communication between the tube 121 and the pipe 122.

With this arrangement there is always free communication between the pipes 119 and 122 and the chamber 116, notwithstanding the rotary movement of the contact wheels.

In order to steady the transformer and help support it I employ two brace members 131 which are secured by means of bolts 132 to the end of the supporting portions 101. These brace members 131 are braced by means of brace rods 133 which connect said members to the front end of the frame. It will be noted that the contact rolls 3 are not only supported by the portions 101 of the frame but are situated considerably in advance thereof and the brace rods 133 serve to stiffen the frame structure and particularly in supporting this overhanging weight. 134 is an interrupter connected in the circuit of the transformer and designed to make and break the circuit in rapid succession. Any suitable interrupter may be employed, such for instance, as shown in United States Patent No. 1,349,303 August 10, 1920. This interrupter comprises a rotary armature constructed so that as it rotates the circuit is made and broken in rapid succession. The interrupter is driven from the gear 63, shown in Fig. 9. For this purpose, said gear meshes with a pinion 135 on a transverse shaft 136 and said shaft has a gear 137 thereon which meshes with and drives a gear 138 on the interrupter shaft. 159 indicates a supporting roll situated in front of the feed rolls 29 and 30. This roll is mounted on a support 160 which is slidable vertically in the bed 2 and is held in adjusted position by an adjusting screw 161.

Figure 14:
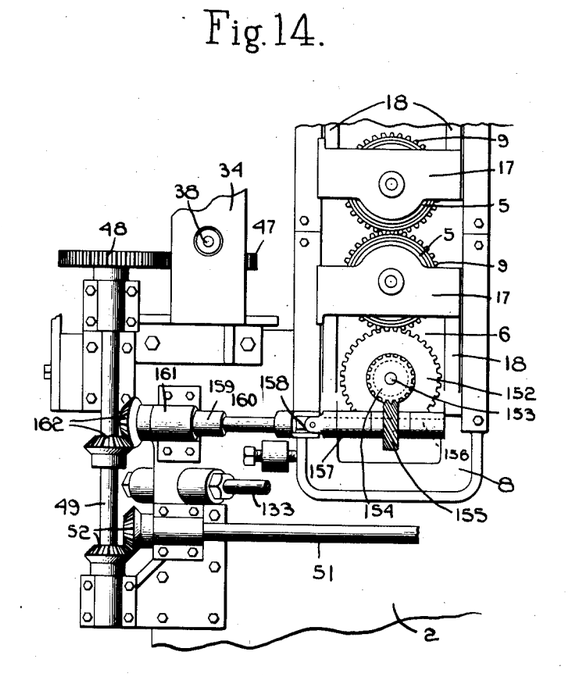
Fig. 14 is a fragmentary view showing means for driving the presser rolls.
Figure 15:
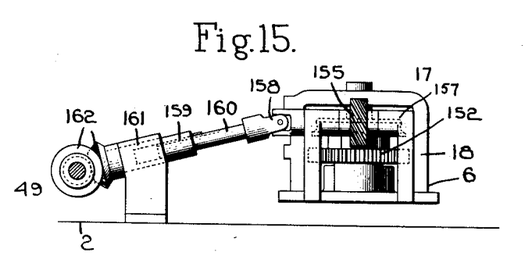
Fig. 15 is a side view of Fig. 14.

In Figs. 14 and 15 I have shown a construction for positively driving the presser rolls 5. The gear 9 for one of the rolls is shown as meshing with and as driven by a gear 152 journalled on a stud 153 carried by the carriage 6, and said gear 152 has a spiral gear 154 rigid therewith which meshes with and is driven by a spiral gear 155 on a cross shaft section 156 journalled in bearings 157 mounted on the slide 6. This shaft section 156 is connected by a universal joint 158 to an expansible shaft section comprising two telescoping members 159 and 160. Said telescoping shaft section being supported in suitable bearings 161. This shaft section is connected by bevelled gears 162 to the shaft 49. In this way the presser rolls 5 are positively driven so that they have a feeding action on the tube and assist in moving the tube forward at a regular rate of speed.

While I have herein illustrated a selected embodiment of my invention I do not wish to be limited to the constructional features shown.

I claim.

1. In a tube welding machine, the combination with welding means, of a pair of feed rolls for feeding a formed tube to the welding means, a stationary frame, a second frame enclosed within the stationary frame and vertically adjustable relative thereto, the lower feed roll being journalled in said second frame, and a U-shaped support situated within the second frame and vertically adjustable relative thereto, the upper feed roll being journalled in said U-shaped support.

2. In a tube welding machine, the combination with welding means, of a pair of feed rolls for feeding a formed tube to the welding means, a stationary frame, a second frame enclosed within the stationary frame and vertically adjustable relative thereto, the lower feed roll being journalled in said second frame, a U-shaped support situated within the second frame and vertically adjustable relative thereto, the upper feed roll being journalled in said U-shaped support, means at the bottom of the stationary frame for adjusting the second frame vertically, and means at the top of the second frame for adjusting the support vertically.

3. In a tube welding machine, the combination with welding means, of a pair of feed rolls for feeding a formed tube to the welding means, a stationary frame, a second frame vertically adjustable in said stationary frame and in which one of the feed rolls is journalled, and a support adjustable in said second frame and in which the other feed roll is journalled.

4. In a tube welding machine, the combination with welding means, of a pair of feed rolls for feeding a formed tube to the welding means, a stationary frame, a second frame vertically adjustable in the stationary frame and in which one of the feed rolls is journalled, a support adjustable in the second frame and in which the other feed roll is journalled, a bracket adjustably carried by the stationary frame, another bracket adjustably carried by the second frame, and rolls carried by said brackets and engaging opposite sides of the tube.

5. In a tube welding machine, the combination with a frame, of a pair of contact rolls, two carriages adjustably carried by the frame, a presser roll mounted on each carriage, said presser rolls acting on the sides of the tube at the point where the welding is made, means for adjusting said carriages toward and from each other, and an auxiliary roll adjustably carried by each carriage and engaging the side of the tube in advance of the presser rolls.

6. In a tube welding machine, the combination with a main frame comprising a bed portion, of two pairs of feed rolls mounted on said bed portion, and mounted on each end thereof, a welding device including contact rolls also sustained on said bed between the pairs of feed rolls, a driving shaft journalled on the bed and geared to both pairs of feed rolls, a supporting member beneath the bed, and a motor thereon operatively connected to the drive shaft.

7. In a tube welding machine, the combination with a frame, of two pairs of feed rolls sustained thereby, a two part head also sustained by the frame, a transformer mounted on said head, a carriage slidably mounted on each section of the head, and a contact roll journalled in each carriage.

8. In a tube welding machine, the combination with a frame, of two pairs of feed rolls sustained thereby, a two part head also sustained by the frame, a transformer mounted on said head, a carriage slidably mounted on each section of the head for movement in a horizontal direction, means to adjust each carriage, a slide vertically adjustable on each carriage, and a contact roll journalled on each side.

9. In a tube welding machine, the combination with a frame having two supporting portions rising therefrom, of a two part head sustained on said supporting portions, a transformer carried by said head, a contact roll journalled on each section of the head, a slide mounted in ways on each supporting portion, a roll carried by each slide and adapted to engage the tube being welded, and means to adjust the slides toward and from each other.

In testimony whereof, I have signed my name to this specification.

FRANCIS G. GALE.